March 6, 1934.                F. C. WHEELER                 1,950,074
                                 PULLEY
                            Filed April 14, 1932
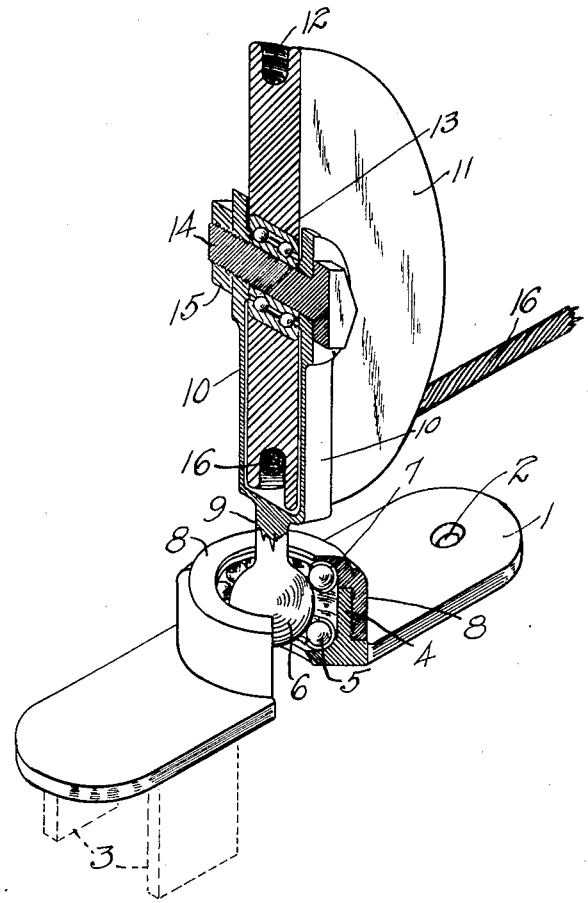
INVENTOR
FRED C. WHEELER
BY
ATTORNEY Patented Mar. 6, 1934

1,950,074

UNITED STATES PATENT OFFICE 1,950,074

PULLEY

Fred C. Wheeler, Detroit, Mich., assignor of one-half to Kosto D. Christoff, Detroit, Mich.

Application April 14, 1932, Serial No. 605,266

2 Claims. (Cl. 254—190)

This invention relates to pulleys and the object of the invention is to provide a pulley particularly adapted for use on airplanes and arranged to carry a cable, the pulley being mounted to swing freely in all directions to prevent kinking of the cable.

Another object of the invention is to provide a bracket adapted for attachment to an airplane and having a socket in which a ball is mounted on ball bearings, the ball being provided with a bracket and the pulley wheel being rotatably mounted on ball bearings between the ends of the bracket.

Another object of the invention is to provide a pulley having a ball and mounted in ball bearings in the socket and arranged so that the pulley may turn freely in all directions so as to accommodate itself to the direction in which the cable is traveling.

These objects and the several novel features of the invention are hereinafter more fully described and claimed and the preferred form of construction by which these objects are attained is shown in the accompanying drawing in which—

The figure is a sectional perspective of a pulley embodying my invention.

As shown on the drawing, a bracket 1 is provided which is adapted for attachment to an airplane. If desired, apertures 2 may be provided through which screws may be inserted to attach the bracket 1 to the airplane or, if desired, the bracket may be welded directly to a metal part of the airplane in which case, it is not necessary to provide apertures 2.

The bracket may also be provided with depending flanges 3 if desired, as shown in dotted lines, which may be fitted over a structural member of the airplane and may be welded or bolted to said structural member. The bracket 1 is provided with an upwardly extending annular flange 4 providing a socket and an annular ball bearing 5 is positioned in the bottom of this socket.

In assembly, the pulley is turned upside down, and the ball-race 7 is positioned in the cap 8 and the cap 8 is positioned over the enlarged ball 6 so that the ball-race 7 extends about the ball stem 9. At this time, the bearing balls are dropped into the ball-races 7 and the pulley is turned over so that the ball 6 may be positioned on the bearing balls in the ball bearing 5. At this time the cap 8 is threaded onto the annular flange 4 of the bracket 1 to secure the parts together in assembled relation. The large ball 6 is provided with a stem 9 which is formed to provide a U-shaped bracket 10. The pulley wheel 11 is circular in form and is provided with a cable groove 12 in the periphery thereof. This pulley wheel 11 is provided with ball bearings 13 at the center and a bolt 14 is inserted through the center of the pulley wheel and through the upper ends of the U-shaped bracket 10. A nut 15 is threaded onto the end of the bolt 14 to secure the pulley wheel in place. A cable 16 is positioned in the cable groove 12 in the periphery of the pulley wheel and this cable extends through the U-shaped bracket 10.

This pulley is particularly adapted for use on airplanes in connection with the cable controls to the ailerons, elevators and rudder controls. For these controls, a flexible cable 16 is utilized and it is necessary that these controls be arranged so that the pulley will allow free movement of the cable in all directions and particularly where the cable changes its direction. In this use, the pulley may swing to any desired angle to accommodate itself to the position of the cable and as the ball 6 may turn on its axis or may turn in any direction in the socket, the pulley will always accommodate itself to the position of the cable and prevent the cable from kinking or twisting or getting out of the cable groove in the pulley. As the pulley wheel is mounted on ball bearings, it is also free to rotate easily at all times so that the airplane controls will operate freely without binding.

From the foregoing description it becomes evident that the device is very simple and efficient in operation, will not easily get out of order, will automatically accommodate itself to any cable position and provides a device which accomplishes the objects described.

Having thus fully described my invention, its utility and mode of operation, what I claim and desire to secure by Letters Patent of the United States is—

1. In a pulley for airplane use, a bracket adapted for attachment to the airplane, the bracket being provided with an extending annular flange, a ball bearing positioned within said annular flange, a large ball mounted on said ball bearing, a second ball bearing positioned on the side of the ball opposite the first ball bearing, a threaded cap threaded onto said annular flange and adapted to engage the second ball bearing and hold it in contact with the large ball, a U-shaped bracket extending upwardly from the large ball and a pulley wheel rotatably mounted between the ends of the U-shaped bracket.

2. In a pulley, a bracket having a socket, a pair of annular ball bearings in the socket, a large ball supported on the ball bearings within the socket, the large ball being provided with a U-shaped bracket, a bolt extending between the ends of the U-shaped bracket, ball bearings supported on the bolt between the ends of the brackets and a pulley wheel rotatably mounted on the ball bearings, the pulley wheel being provided with a cable groove in its periphery.

FRED C. WHEELER.